United States Patent [19]

Henson

[11] 4,353,593
[45] Oct. 12, 1982

[54] SUN VISOR

[76] Inventor: Artel R. Henson, P.O. Box 1487, Green Valley, Ariz. 85614

[21] Appl. No.: 257,976

[22] Filed: Apr. 27, 1981

Related U.S. Application Data

[63] Continuation of Ser. No. 109,126, Dec. 31, 1979, abandoned.

[51] Int. Cl.³ .............................................. B60J 3/00
[52] U.S. Cl. ........................... 296/97 D; 160/DIG. 2; 160/354
[58] Field of Search ............. 296/97 D, 97 C; 24/204; 160/354, DIG. 2

[56] References Cited

U.S. PATENT DOCUMENTS

| | | | |
|---|---|---|---|
| 2,278,011 | 3/1942 | Murdock | 296/97 C |
| 2,287,581 | 6/1942 | Walker | 296/97 C |
| 2,524,617 | 10/1950 | Wyse | 296/97 C |
| 2,595,833 | 5/1952 | Flaherty | 296/97 D |
| 2,639,751 | 5/1953 | Flaherty | 24/201 B |
| 3,282,623 | 11/1966 | Paro | 296/97 D |
| 3,387,341 | 6/1968 | Mates | 24/204 |
| 3,466,774 | 9/1969 | Borrensen | 24/204 |
| 3,505,772 | 4/1970 | Claire | 24/204 |
| 3,753,458 | 8/1973 | Lazarek | 160/354 |
| 4,023,855 | 5/1977 | Janata | 296/97 C |

*Primary Examiner*—Robert R. Song
*Attorney, Agent, or Firm*—Harness, Dickey & Pierce

[57] ABSTRACT

A sun visor for a passenger carrying vehicle or other compartments, which visor is capable of being color-coordinated and completely withdrawn from view. One embodiment comprises a sheet or plate of substantially rigid or relatively flexible material, either opaque or translucent, having a fastening element at the periphery thereof which can be fastened to a second fastening element attached to selected positions in the interior of said vehicle, either cooperable with or independent of a conventional panel visor, for the driver and any passengers of the vehicle. Another embodiment is integrated with a modified conventional panel visor to extend sun shading or screwing or to provide glare reduction from the bottom or sides of the panel visor for the driver and passengers that have access to a conventional panel visor.

6 Claims, 8 Drawing Figures

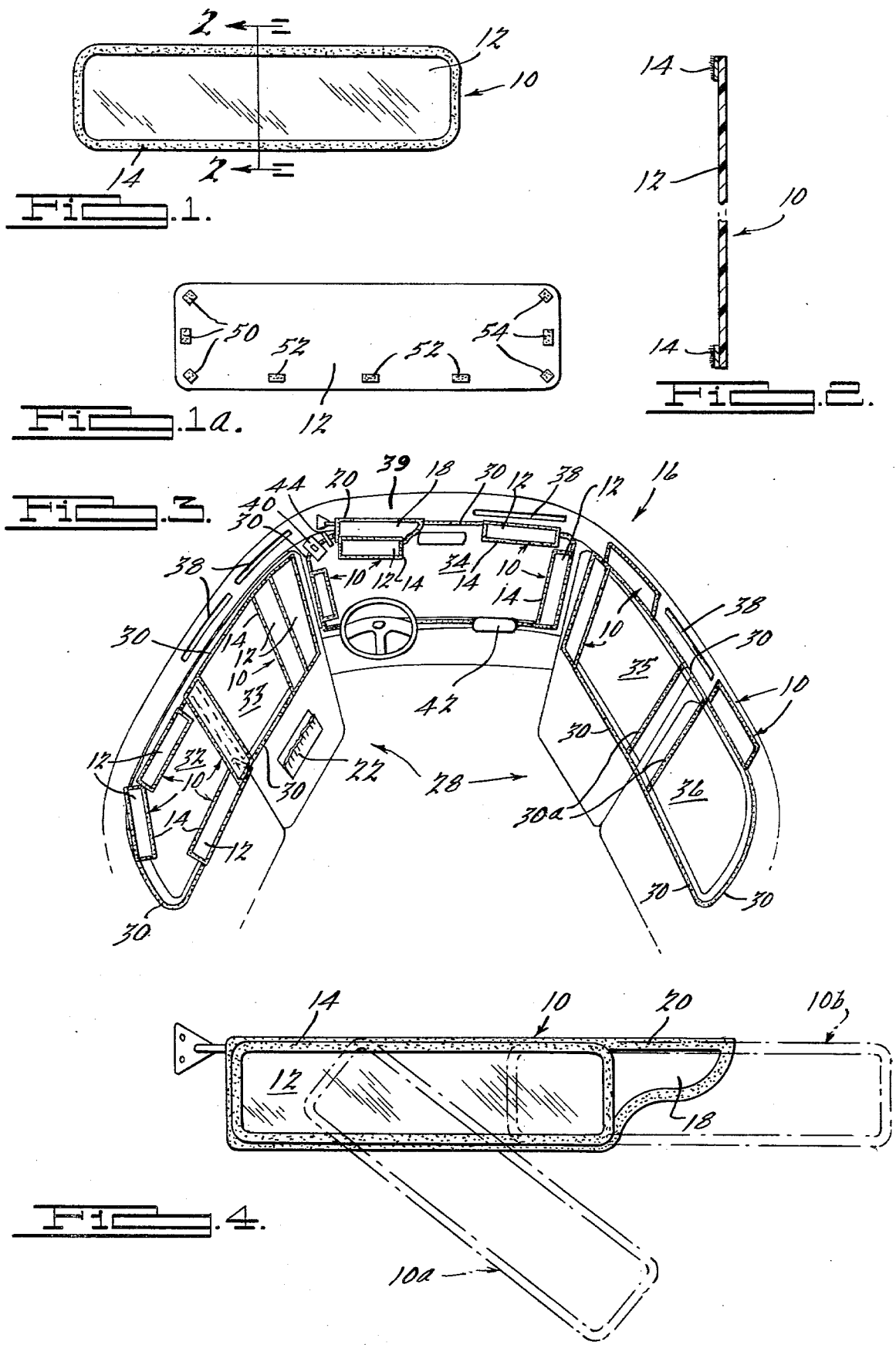

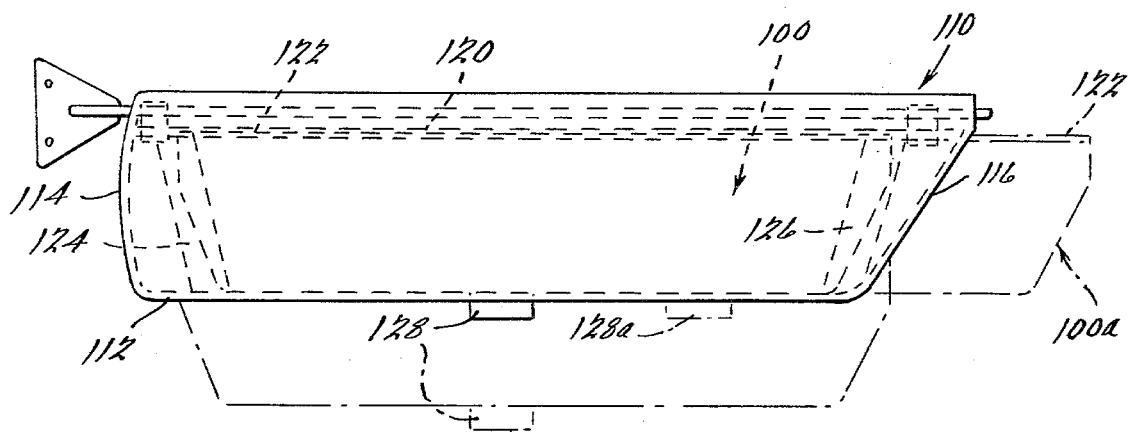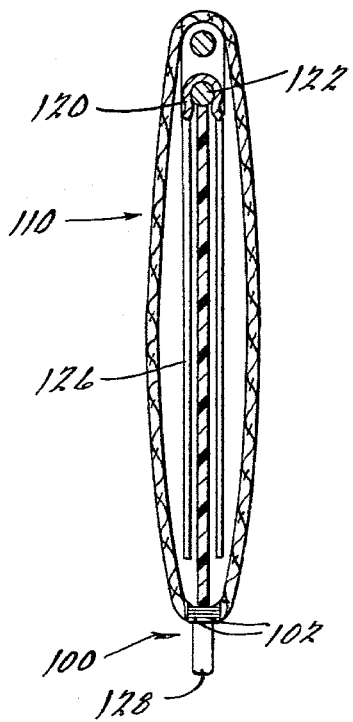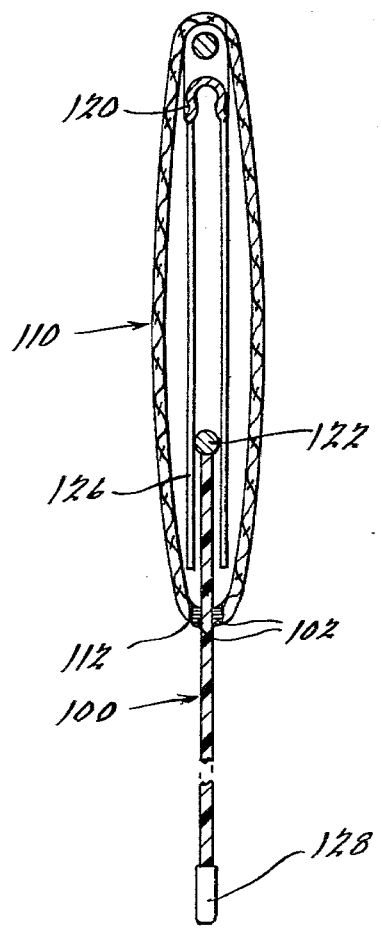

SUN VISOR

This is a continuation of application Ser. No. 109,126, filed Dec. 31, 1979, abandoned.

BACKGROUND AND SUMMARY OF THE INVENTION

The present invention relates generally to sun visors and more particularly to new and improved sun visors having a multiplicity of positions and intended to be used not only by the driver of a vehicle but also by any passengers in the vehicle, and possibly other compartments having windows, such as houses.

Prior art sun visors for motor vehicles include tinted windows and some types of extenders for the conventional pivotal panel type of motor vehicle visors most commonly used in present day automobiles, having a panel structure pivotally mounted to an L-shaped post, which post is in turn pivotally mounted above the front window of the automobile. Several types of sun visor extenders exist in the prior art as are depicted, for example, in U.S. Pat. Nos. 2,226,056 (Fletcher), 2,667,222 (McCarthy et al.), 3,617,088 (Graham), 4,058,340 (Pinkas), and others, which are primarily directed to the reduction of glare for the driver of the vehicle, or in some cases passengers alongside the driver. Other devices, such as that disclosed in U.S. Pat. No. 3,282,623 (Paro), are directed to passengers other than the driver of the vehicle.

The present invention relates to the concept of optional glare reduction and sun shading for all of the occupants of the vehicle or compartment with complete interchangeability of the sun visor between the various occupants and various windows to maximize the comfort level of the vehicle as the position of the sun changes relative to the interior of the vehicle or the compartment. A device of the present invention is useful in automobiles, airplanes, trains, buses, or any other passenger-carrying vehicle and other windowed compartments, such as houses. One embodiment of the present invention, however, is directed to an improvement of prior art sun visor extenders which are primarily directed to reduction of glare and shading the sun for the driver of the vehicle and passengers alongside the driver, modifying conventional vehicle panel visors.

One embodiment of the present invention has the further object to provide the comfort objective in an effortless and inexpensive manner and also in a manner either dependent upon or independent from present day visors, so as to make the present day panel visors optional in passenger vehicles.

The present invention also has the advantage that the devices comprising the system for reducing glare and shading in a passenger vehicle or other compartment can be color-coordinated for aesthetic appeal to those purchasers and passengers of the vehicle in which the devices are used. Also, the devices of the present invention are capable of being completely withdrawn from view when not in use, adding to their aesthetic appeal.

One embodiment of the present invention, utilizing friction or magnetic fasteners to hold the visors in place, has the added advantage of providing attachment means for a variety of vehicle accessories, such as automatic garage door actuators, vanity mirrors, writing implements, and many others.

Other objects and advantages of the instant invention will be apparent in the following specification, claims, and drawings.

BRIEF DESCRIPTION OF THE DRAWINGS

FIG. 1 is a front elevational view of a sun visor of one embodiment of the present invention;

FIG. 1a is a front elevational view of a sun visor similar to that illustrated in FIG. 1, having discontinuous fastening elements;

FIG. 2 is a vertical sectional view along the line 2—2 of FIG. 1;

FIG. 3 is a panoramic view of the interior of an automobile demonstrating a combination of sun visors of the present invention used as a system to reduce glare and shade the sun in a fully occupied automobile;

FIG. 4 is a rear elevational view of a sun visor in association with a conventional panel visor of an automotive vehicle;

FIG. 5 is a rear elevational view of an alternative embodiment of the present invention mounted in an automotive vehicle;

FIG. 6 is a vertical sectional view along the line 6—6 of FIG. 5 (closed);

FIG. 7 is a vertical sectional view along the line 7—7 of FIG. 5 (open).

DESCRIPTION OF THE PREFERRED EMBODIMENT

Referring to FIGS. 1 and 2, a preferred embodiment of a sun visor 10 of the present invention is illustrated. A plate or sheet of plastic, glass, or a hybrid thereof 12, which may be translucent or opaque, and also may be polarized if so desired, is bounded at its periphery with a fastening element 14. In the preferred embodiment the sheet 12 is made of plastic due to its light weight and its substantially stiff yet relatively flexible characteristics. Depending upon usage considerations, the material used for the sheet 12 can be as flexible or stiff as necessary. For a flexible sheet, a wire frame (not shown) may even be used at the fastener edge.

Fastening element 14 is a friction hook and loop fastener such as that marketed under the trademark Velcro (No. 1,027,417), issued Dec. 16, 1975, to Velcro, Inc., of Manchester, N.H. or under the trademark Flexloc (No. 1,041,377), issued June 15, 1976 to Scovill Mfg. Co., of Waterbury, Conn. The fastening element 14, however, may be any one of a number of types of fasteners such as snaps, zippers, adhesive, or any other friction type of fastener. Alternatively, the fastening element 14 may be metal as a component of a magnetic fastener.

FIGS. 3 and 4 illustrate sun visors 10 as used in one selected environment, the interior of an automobile 16. In FIG. 3, a sun visor 10 is shown mounted on a conventional panel visor 18 of an automobile 16. The panel visor 18 in the preferred embodiment has a hook and loop fastening element 20 along its periphery to which the fastening element 14 of the sun visor 10 can attach. Referring to FIG. 4, the sun visor 10 can be placed at any position relative to the panel visor 18, as shown by sun visors 10a and 10b. The sun visor 10 may be stored on the panel visor 18, as shown in FIG. 4, or may be placed in a storage container, such as a map pocket 22 or slot 38 (FIG. 3), or any other convenient storage place.

A system of sun visors 10 may be used in connection with or completely independently from the conventional panel visor 18 used in automobile interiors. Referring to FIG. 3, an automobile interior 28 is illustrated having mounting strips 30 of hook and loop friction fasteners positioned around the windows 32, 33, 34, 35, and 36 of the vehicle to offer a multiplicity of positions at which to mount a sun visor 10. The strips 30 may also be positioned detachably across the windows as shown by strips 30a. The strips 30 may be integral with the headliner 39 or the trim around the windows 32, 33, 34, 35, and 36 or other interior trim of the vehicle to be utilized as original equipment in newly manufactured vehicles, or may be attached as the strips 30 are shown in FIG. 3 to be directed to the aftermarket or as options to be installed at automobile dealerships.

To obtain an aesthetically appealing environment, the sun visors 10 and the mounting strips 30 may be color coordinated with the vehicle interior 28, or the automobile in general. Storage mounting slots 38 in the headliner 39 of the vehicle interior 28 may also be utilized, to provide hidden storage of the visors 10, or map pockets 22 can be provided at positions throughout the interior 28 to store the sun visor 10 out of view when not in use. The same fasteners 30 may be used to attach garage door actuators 40, vanity mirrors 42, writing implements 44, and other accessories as desired within the interior of the vehicle.

Alternatively, as illustrated in FIG. 1a, the fasteners 50, 52, 54 may be spaced apart rather than be continuous along the periphery of the sun visors 10 or be a strip as previously shown for the mounting fasteners.

The sun visors 10 as illustrated and described herein are not meant to be limited to the size shown which is approximately the size of a conventional panel visor. On the contrary, the visor 10 may be large enough to span an entire window, the windshield, or even a series of windows. Also, a sun visor 10 may be utilized in a house or other compartment to span either a part of, a series of, or the entirety of a window.

An alternative embodiment to the sun visor concept of FIGS. 1 to 4 is illustrated in FIGS. 5, 6 and 7, in which the sun visor 100 is intended to be used within a modified conventional panel visor 110. The panel visor 110 is open along the bottom 112 and sides 114 and 116, having friction fasteners 102 such as hook and loop (Velcro or Flexloc), adhesive, or snap fasteners or zippers, magnets, or other type of fasteners lining the bottom 114 and sides 116 and 118 to seal the edges of the panel visor 110 closed. The interior of the panel visor 110 comprises a track 120 having the cross-section of and the characteristics of a clip (FIG. 6) in which the thicker top edge 122 of the sun visor 100 can be held. The sun visor 100 can slide along the longitudinal axis of the track 120 with the top edge 122 inserted in the track 120. The interior of the panel visor 110 also includes two C-shaped holding members 124 and 126 biased against the sun visor 100 to retain the sun visor 100 in the panel visor 110 when the top edge 122 has been released from the track 120 and the sun visor 100 has been lowered. The sun visor 100 may be of either variable or teardrop cross-section to provide variable shading of sun glare when in operation, or of a uniform cross-section, as shown in FIGS. 6 and 7, with a thicker top edge 122. Either construction will provide easier movement of the sun visor 100 within the panel visor 110 since the thicker upper edge such as that shown by edge 122 would be the only portion of the sun visor 100 being held substantially at any time by holding members 124 and 126 when the sun visor 100 has been released from the track.

The sun visor 100 will be positioned completely within the panel visor 110 when not in use (FIG. 6). The fastening elements 102 will seal the periphery of the panel visor 100 with only the sun visor tab 128 exposed. As the sun visor 100 is pulled down by means of the tab 128, it will be released from the track 120, and also separate the fastening elements 102 at the bottom edge 114 of the panel visor 110. The holding members 124 and 126 will retain the sun visor 100 in a selected position extended from the panel visor 110 (FIG. 7).

The sun visor 100 may also be employed as a side extension of the panel visor 110. The sun visor 100a may be moved via tab 128a to either side, opening the fastening elements 102 on the side selected and the bottom edge 114 as the tab 128a passes along that edge 114. When the sun visor 100 has reached its selected side position, the fastening elements 102 may be closed along the bottom edge 114.

To store the sun visor 100, the sun visor 100 is returned to a position completely within the panel visor 110 and the fastening elements 102 are thereafter manually closed.

In each embodiment of the sun visor as presented herein the aesthetically appealing option is available of withdrawing the visors from view if so desired. Also, although the drawings depict an environment related to automotive vehicles, a device of the present invention is equally useful in airplanes, busses, trucks, vans, boats, and any other passenger-carrying vehicle.

Illustrative embodiments of the instant invention which fully and effectively accomplishes the objects thereof is herein disclosed in the above description and in the drawings. However, it will be apparent that variations in the details of the apparatus may be indulged in without departing from the sphere of the invention herein described, or the scope of the appended claims.

What is claimed is:

1. A system of fastening means for the interior of a passenger-carrying vehicle, comprising:
    first fastening means at multiple selected locations within the vehicle including locations adjacent the peripheral edges of portions of the front and side windows of the vehicle, said first fastening means comprising elongated fastening elements extending substantially the entire length of said edge portions of said vehicle windows, in said interior;
    accessory means to be used in said interior; and
    second fastening means fixedly attached to said accessory means and capable of being fastened to and separated from said first fastening means;
    said first fastening means including both multiple means for operably disposing said accessories and multiple means for storing said accessories at multiple locations throughout the interior of said vehicle;
    whereby said accessory means may be utilized or stored at selected positions throughout said interior.

2. A system in accordance with claim 1, wherein said accessory means comprises at least one sun visor comprising a sheet of relatively flexible, lightweight material.

3. A system in accordance with claim 2, wherein said material is translucent.

4. A system in accordance with claim 1, wherein said first fastening means comprises a strip of material capable of being fastened by friction to said second fastening means.

5. A system in accordance with claim 1, wherein said first and second fastening means comprises hook and loop fasteners.

6. A system in accordance with claim 1, wherein said system further comprises multiple pocket means for storing said accessories at multiple locations throughout the interior of said vehicle.

* * * * *